United States Patent
Liao et al.

(10) Patent No.: US 7,423,764 B2
(45) Date of Patent: Sep. 9, 2008

(54) INTEGRATED INTERFERENCE SCANNING METHOD

(75) Inventors: Chieh-Cheng Liao, Taoyuan Hsien (TW); Yao-Min Lin, Taoyuan Hsien (TW); Huang-Chang Chang, Taoyuan Hsien (TW); Wei-Che Chang, Taoyuan Hsien (TW)

(73) Assignee: Chroma Ate Inc., Taoyuan Hsien (TW)

( * ) Notice: Subject to any disclaimer, the term of this patent is extended or adjusted under 35 U.S.C. 154(b) by 121 days.

(21) Appl. No.: 11/373,288

(22) Filed: Mar. 13, 2006

(65) Prior Publication Data

US 2007/0097379 A1    May 3, 2007

(30) Foreign Application Priority Data

Oct. 27, 2005    (TW) .............................. 94137615 A

(51) Int. Cl.
*G01B 11/02* (2006.01)
(52) U.S. Cl. ...................................... 356/497; 356/511

(58) Field of Classification Search ................. 356/497, 356/498, 511, 512, 516
See application file for complete search history.

(56) References Cited

U.S. PATENT DOCUMENTS 5,471,303 A * 11/1995  Ai et al. ...................... 356/497

* cited by examiner

*Primary Examiner*—Michael A Lyons
(74) *Attorney, Agent, or Firm*—Birch, Stewart, Kolasch & Birch, LLP

(57) ABSTRACT

An integrated interference scanning method, mainly used to integrate the respective advantages of VSI and PSI measurements, hereby achieving the characteristic of high precision and limitless measurement range. In particular, the slope correction factor and the displacement correction factor between the VSI measurement and PSI measurement may be utilized to execute the integration calculation of the height data arrays of the VSI and PSI, so that the scanning procedure may be achieved through merely using the wideband light source of the interference scanning system, as such reducing the errors and complexity of the interference scanning system.

8 Claims, 3 Drawing Sheets

INTEGRATED INTERFERENCE SCANNING METHOD

BACKGROUND OF THE INVENTION

1. Field of the Invention

The present invention relates to an integrated interference scanning method, and in particular to an interference scanning method integrating the VSI and PSI measurements.

2. The Prior Arts

In the prior art, the interferometry is utilized to obtain the surface profile of the object to be measured through the interference fringes by making use of the light path difference and interference principle. In general, in terms of computation algorithm, the interferometry technology can be classified into: the Vertical Scanning Interferometry (VSI) and Phase Shifting Interferometry (PSI).

In the VSI scanning technology, the advantage of white light having short coherent wavelength is utilized to get rid of the interference noise, and derive the 3-D profile according to the wave-packet interference distribution. The measurement range of VSI algorithm does not have any limitations, and can be utilized to measure the object having large step height differences. However, if the resolution in the vertical direction is to be raised, then the step magnitude of scan in the vertical direction must be reduced. Therefore, the time spent on measurement will be increased accordingly. Besides, its major drawback is that the accuracy or precision of the measurement is not very satisfactory. In summary, the Vertical Scanning Interferometry (VSI) is suitable for the measurement environment with lower precision, or the object to be measured having rough surface and large step differences. On the other hand, PSI scanning technology can be used to restore the 3-D profile of the object in cooperation with various phase rebuilt technology. Compared with VSI, PSI may be used to provide better precision; however, the depth measurement range is limited by the measuring light wavelength and the $2\pi$ ambiguity. Therefore, it is not suitable for measuring object having step difference greater than $\lambda/4$, such as the object to be measured having a large step height. Regarding this, a double-wavelength light wave phase-shift interferometry has been developed recently, which can be used to enlarge the measurement range of a large step height. However, when the wavelength of the coherent light wave is longer, it may cause the increase of noise due to self-interference, and this problem is difficult to solve with the present technology.

In this respect, some integrated measurement method is proposed to fully utilize the advantage and redress the shortcomings of the VSI and PSI measurements.

Since the zero optical path difference of VSI is calculated and obtained by utilizing the wave-packet information of the vertical scanning, every individual pixel is independent and is not affected by other pixels. However, in PSI, the height of said point is calculated and obtained by the phase change relative to the adjacent pixels. Yet, in the measurement utilizing PSI, if the light of wideband is utilized as the light source, then the spacings between the interference fringes (namely, the average wavelength) of the interference spectrum are practically affected by the numeral aperture (NA) of the optical system, thus resulting in the deviation between the average wavelength calculated from the spacing between the interference fringes and the actual average wavelength. Therefore, when merging the height information of VSI and PSI, their heights cannot be merged directly (since there are the inconsistence of height difference (intersection distance) and inclination (affected by the slope-NA value). For this reason, the conventional technology requires a single frequency light of known wavelength to eliminate such a deviation and achieve precise PSI measurement. Therefore, in this conventional scanning system, in addition to the wideband light source used for VSI measurement, another narrow-band light source is required for PSI measurement.

As such, in the conventional scanning system, both the wideband light source and narrow-band light source are provided. Thus, the VSI measurement is first performed utilizing the white light source, then the system is switched to a narrow-band light source by making use of a switching mechanism to perform PSI measurement of the object required, thereby realizing a two-stage measurement. However, in the implementation of this technology, two light sources are required to perform the VSI and PSI measurements respectively. Therefore, an additional mechanism is required to do the switching, hereby raising the cost of the system. Moreover, since a two-stage scanning is required in this conventional measurement, the vertical scan- image-fetching action has to be performed both in VSI and PSI, thus the measurement efficiency is adversely affected.

Therefore, in view of the shortcomings and drawbacks of the interference measurement system of the prior art, the research and development of an integrated interference scanning method, which is capable of providing much more simple, fast and accurate measurement, is the most urgent and important task in this field.

SUMMARY OF THE INVENTION

In view of the shortcomings and drawbacks of the prior art, the objective of the present invention is to provide an integrated interference scanning method, which is utilized to execute the integration calculation of the height data arrays of VSI and PSI by making use of the NA factor (slope correction factor) and the Base Height (displacement correction factor) between the VSI measurement and PSI measurement, so that the interference scanning system of the present invention may be utilized to realize the scanning procedures required by merely utilizing the wideband light source. In other words, in the present invention the slope correction factor is used to correct the wavelength deviation of the distant field, so that there is no need to add an additional narrow-band light source just for the PSI measurement, thereby reducing the error and complexity of the interference scanning system. In the following description, for easy explanation and understanding, the NA factor is referred to as the slope correction factor, and the Base Height is referred to as the displacement correction factor.

In accordance with the above-mentioned objective, the present invention provides an integrated interference scanning method, which can be utilized to integrate the height data arrays obtained by making use of Vertical Scanning Interferometry (VSI) and Phase Shifting Interferometry (PSI).

In practice, the integrated interference scanning method of the present invention is realized by firstly proceeding with the scanning of the object to be measured by means of the wideband light source of the interference scanning system, thus obtaining the scanned information. Next, the VSI is utilized to measure and obtain the VIS height data arrays based on the scanned information thus obtained. Then, the PSI measurement is made to obtain the PSI height data arrays relative to the position of zero-light-path-difference based on the same scanned information. And finally, the integration calculation of the VIS height data array and PSI height data array is executed based on the slope correction factor and displacement correction factor between the VSI measurement and PSI measurement.

Further scope of the applicability of the present invention will become apparent from the detailed description given hereinafter. However, it should be understood that the detailed description and specific examples, while indicating preferred embodiments of the present invention, are given by way of illustration only, since various changes and modifications within the spirit and scope of the present invention will become apparent to those skilled in the art from this detailed description.

BRIEF DESCRIPTION OF THE DRAWINGS

The related drawings in connection with the detailed description of the present invention to be made later are described briefly as follows, in which.

DETAILED DESCRIPTION OF THE PREFERRED EMBODIMENT

The purpose, construction, features, and functions of the present invention can be appreciated and understood more thoroughly through the following detailed description with reference to the attached drawings.

Figure 1:
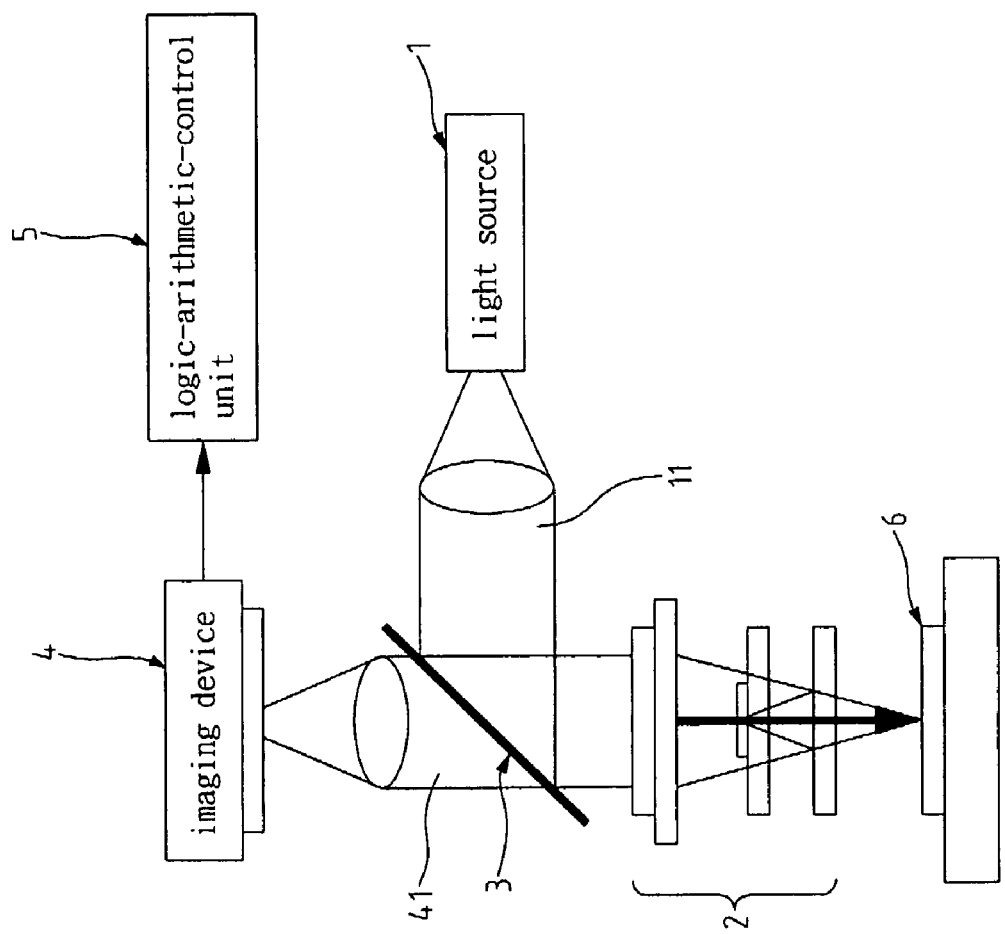
FIG. 1 is a schematic diagram of the structure of an interference scanning system according to an embodiment of the present invention.

FIG. 1 is a schematic diagram of the structure of an interference scanning system according to an embodiment of the present invention. As shown in FIG. 1, the interference scanning system of the present invention includes: a light source 1, a set of object lenses 2, a light beam guidance device 3, an imaging device 4, and a logic and arithmetic control unit 5.

In short, the essence of the integrated interference scanning method of the present invention lies in conducting the scanning of the object 6 to be measured by utilizing a single and white light source (wideband light source), thereby reducing the error and complexity of the scanning system. In implementing the integration calculation of the height data array obtained by the VSI and PSI measurements through scanning by making use of the light emitted by a single white light source (wideband light source), the method of the present invention may be used to obtain the same or better result than that of conventional technology through the utilization of the slope correction factor, displacement correct factor between the VSI measurement and PSI measurement, in particular through the correction of the distant field wavelength deviation with the slope correction factor. Namely, the method of the present invention can be used to achieve the advantages and characteristics of high precision and limitless measurement range by integrating the respective merits of VSI and PSI measurements, thus reducing the error and complexity of the scanning system.

Compared with the conventional technology, the method of the present invention may likewise be utilized to conduct gross measurement of the object 6 to be measured by utilizing the characteristics of large range measurement and large step difference measuring capability of the VSI measurement, and further measurement of the portion requiring minute measurement at the position of the selected zero-light-path-difference is conducted by making use of the high degree precision of PSI. Therefore, the similar portions of the present invention relating to PSI and VSI measurements will not be described here in detail, and only the portions different to those of conventional technology will be described in detail.

Two methods of integrating the VSI and PSI measurements will first be described. Then it will be described as to how the measured results of VSI and PSI can be integrated by means of slope correction factor and displacement correction factor. Finally, the interference scanning system of the present invention as shown in FIG. 1 will be described in detail.

In the present invention, two methods are utilized to integrate the measurements of VSI and PSI: 90-degree phase shift scanning and two-stage scanning, one of which is selected to implement according to the height distribution of the object 6 to be measured.

Figure 2A:
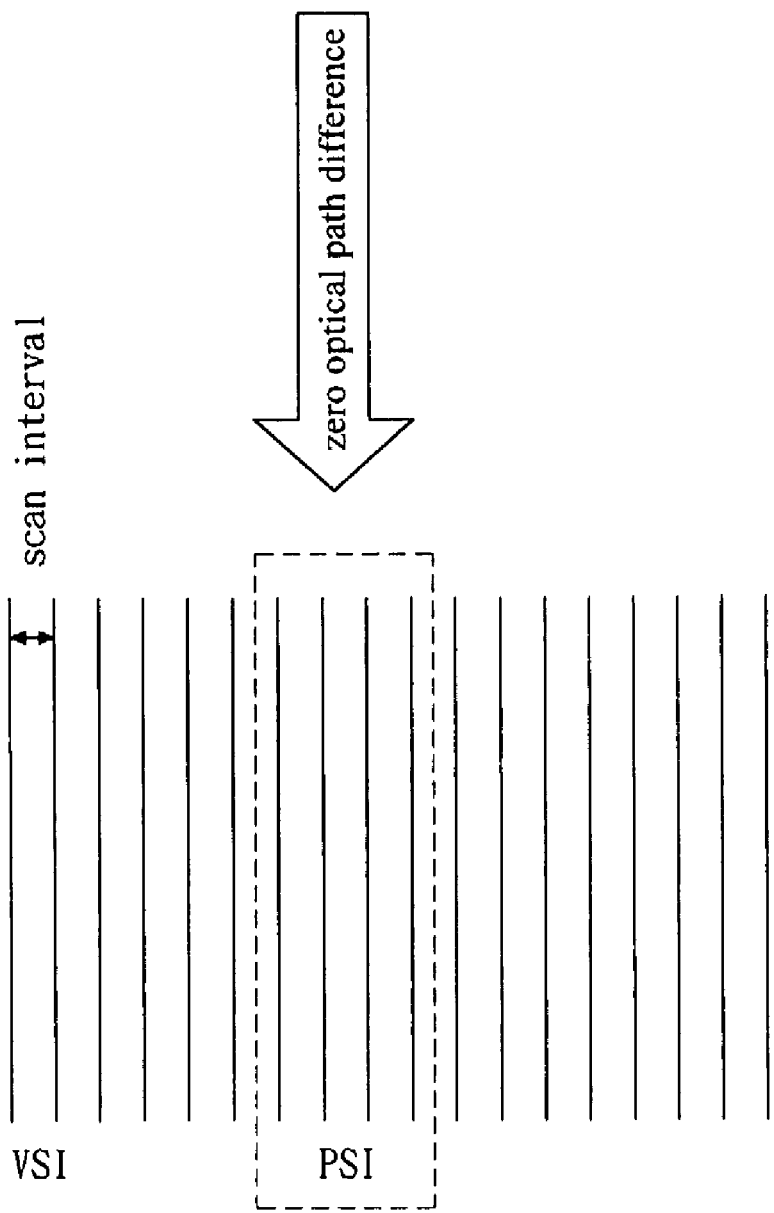
FIG. 2A is a schematic diagram of a 90-degree phase shift scanning scheme, which is mainly used on the height distribution of the object in a small range according an embodiment of the present invention.
Figure 2B:
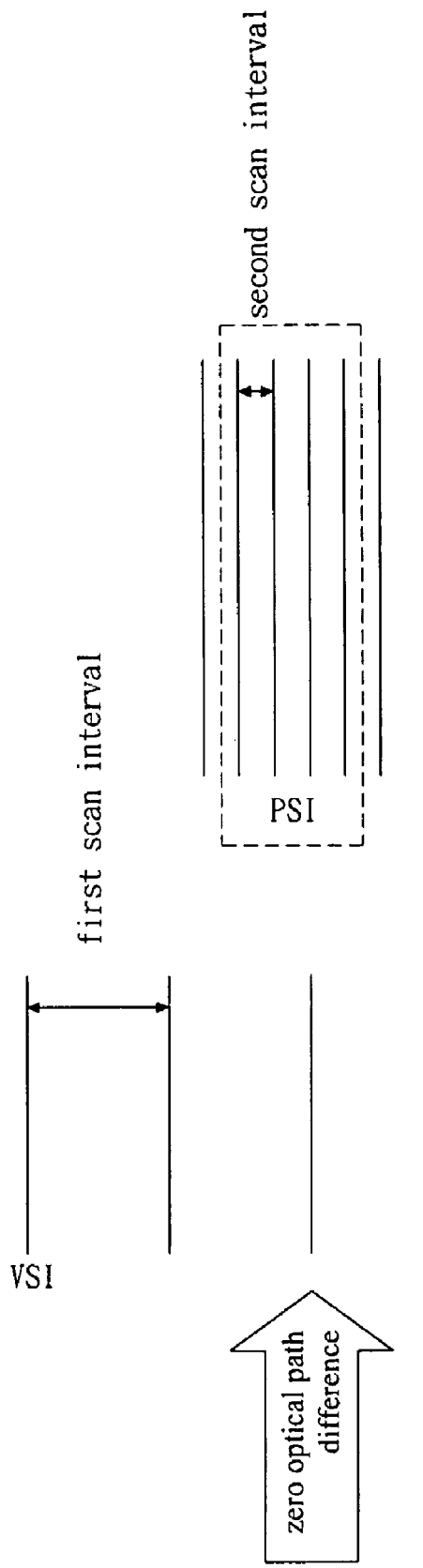
FIG. 2B is a schematic diagram of a two-stage scanning scheme, which is mainly used on the height distribution of the object in a large range according an embodiment of the present invention.

Next, referring to FIGS. 2A and 2B for the schematic diagrams indicating the schemes of integrating the VSI and PSI measurements. FIG. 2A indicates the 90-degree phase shift scanning scheme, which is mainly used on the height distribution of the object 6 in a small range. Since the scanning range is relatively small, the scanning needs only be done once on the object 6 to be scanned by the wideband light source of the interference scanning system, and then the scanned information thus obtained is used to proceed with the VSI and PSI measurements. On the other hand, the two-stage scanning of the present invention as shown in FIG. 2B is only suitable to be used for the height distribution of the object 6 to be measured in a large range.

The reason for the above is that, when the object 6 to be measured is a step height or bump of height of tens of microns, if the 90-degree phase shift scanning scheme shown in FIG. 2A is utilized in this condition, the entire scanning process will last too long. However, for the height distribution of the object 6 to be measured in a large range, the two-stage scanning scheme as shown in FIG. 2B may be used, so that the scanning process may be completed in a shorter period of time.

In the 90-degree phase shift scanning scheme as shown in FIG. 2A, the wideband light source of the interference scanning system is first utilized to perform the scanning of the object 6 to be measured, then the obtained scanned information is provided to be used in the subsequent VSI and VPI measurement. Next, the VSI is utilized to measure and obtain the VSI height data array (VSI (i, j)) based on the scanned information. Then, PSI is utilized to measure and obtain the PSI height data array (PSI (i, j)) relative to the position of zero-optical-path-difference (OPD) shown in FIG. 2A based on the scanned information. And finally, integration calculation of the VSI height data array and PSI height data array is implemented based on the slope correction factor and the displacement correction factor between VSI measurement and PSI measurement (the details of the integration calculation will be explained in detail later).

In the two-stage scanning scheme as shown in FIG. 2B, the scanning is performed twice (in a first scan interval and in a second scan interval respectively) (with the first scan interval greater than the second scan interval, and the second scan interval is 90°), thereby obtaining the first scanning information and the second scanning information. Then the integration calculation is performed.

More specifically, in the integrated interference scanning method of the present invention, the light emitted from the wideband light source of the interference scanning system is first used to scan the object 6 to be measured according to the first scan interval, thus obtaining the first scanned information. Then, VSI is utilized to measure and obtain the VSI height data array (VSI (i, j)) based on the first scanned information. Then, the interference scan system having the wideband light source is used to perform the scanning of the object 6 to be measured by using the second scan interval to obtain the second scanned information, and utilize PSI to measure and obtain the PSI height data array (PSI (i, j)) based on the second scanned information. And finally, the integration calculation is performed for the VSI height data array and PSI height data array based on the slope correction factor and the displacement correction factor.

Regardless of the above-mentioned VSI and PSI height data array obtained through the 90-degree phase shift scan as shown in FIG. 2A or the two-stage scan as shown in FIG. 2B, the VSI height data array VSI (i, j)) and PSI height data array PSI (i, j) obtained by utilizing the integrated interference scanning method or the technology as disclosed in U.S. Pat. No. 5,471,303, have to be combined and then corrected due to the difference of the their seeding points. In the method of the present invention, the combination and correction are realized by slope and displacement respectively; namely, it is realized through the slope correction factor and displacement correction factor between the VSI measurement and the PSI measurement.

Since in the PSI height data array, the pixel point of the best quality is selected as the PSI seeding point, while the scan starting point for the object to be measured is selected as the VSI seeding point, thus the difference of height of VSI seeding point VSI ($X_{seeding\ point}$, $Y_{seeding\ point}$) and PSI seeding point PSI ($X_{seeding\ point}$, $Y_{seeding\ point}$) is considered as the displacement correction factor. For detailed description of the algorithm of the displacement correction factor, please refer to U.S. Pat. No. 5,471,303.

In order to overcome and correct the distant field wavelength deviation produced during PSI measurement by utilizing the wideband light source, in the integrated interference scanning method of the present invention, the slope correction factor is used to correct the wavelength deviation of distant field without having to additionally install narrowband light source just for PSI measurement, thereby reducing the error and complexity of the scanning system. The calculation of the slope correction factor (NA factor) is as follows:

NA factor=Slope (VSI (i,j))/Slope (PSI (i, j));

Namely, the slopes {Slope (VSI (i, j), Slope (PSI (i, j))) of VSI and PSI are calculated respectively through the linear equation fitting coefficient according to the height data arrays of VSI and PSI. Then, the slope correction factor is obtained through dividing the slope of VSI by the slope of PSI.

Upon obtaining the slope correction factor and the displacement correction factor, the integration calculation may be performed to convert the PSI height data array into the VSI height data array by using these two factors. The integration equation is as follows:

If (Height (i, j) is in the selected PSI area), then

Height (i, j)=PSI (i, j)×NA factor+Base Height

Else Height (i, j)=VSI (i, j)

Namely, the PSI height data array multiplied by the slope correction factor and then added by the displacement correction factor, and the resulting PSI height data array thus obtained can then be put together with the VSI height data array for integration calculation.

The structure and functions of the interference scanning system utilized by the interference scanning method of the present invention will be described in detail hereinbelow.

Compared with the structure disclosed in U.S. Pat. No. 5,471,303, only one set of wideband light source 1 is required to be used in the interference scanning system of the present invention. Moreover, since there is no need to switch between two light sources, the interference scanning system of the present invention is not provided with switching device.

As shown in FIG. 1, the interference scanning system includes the following devices: a light source 1, which is used to generate the incident light beam 11 of the light source signal, and in particular generate the incident light beam 11 of the white light source signal; a set of object lenses 2, which includes the interference object lenses and the focal length adjustment means; a light beam guidance device 3, which is an optical mechanism and is used to guide the light source signal in the light beam guidance system, and it can be for example, a light splitter; an imaging device 4, which is an optical device having image fetching means, and it can be for example a CCD or CMOS optical sensing element and the related control and signal transmission circuit; and a logic-arithmetic-control unit 5, which is composed of a logic-arithmetic means, a memory means, and a control means, and can be realized with an electronic circuit or a computer system, and its logic-arithmetic means can be used to perform the VSI operation and PSI operation. Thus, in the above-mentioned structure, an incident light beam 11 coming from a light source 1 is reflected by the light beam guidance device 3 to a set of object lenses 2, so that the incident light beam 11 reaches the object 6 to be measured and is reflected into the reflected light 41 containing interference signal, which passes the set of object lenses 2 and is fetched by he imaging device 4 after penetrating through the light beam guidance device 3. As such, the logic-arithmetic-control unit 5 may proceed to record the optical information of the object 6 to be measured as fetched by the imaging device 4 by means of the control means and the memory means, so that the interference scanning method of the present invention may be utilized to calculate the optical information fetched by the imaging device 4 and obtain the surface profile information of the object 6 to be measured through the logic-arithmetic means of the logic-arithmetic-control unit 5.

The above detailed description of the preferred embodiment is intended to describe more clearly the characteristics and spirit of the present invention. However, the preferred embodiments disclosed above are not intended to be any restrictions to the scope of the present invention. Conversely, its purpose is to include the various changes and equivalent arrangements that are within the scope of the appended claims.

What is claimed is:

1. An integrated interference scanning method, which is used to integrate a VSI (vertical scanning interferometry) height data array measured by performing vertical scanning interferometry and a PSI (phase shifting interferometry) height data array measured by performing phase shifting interferometry, the integrated interference scanning method comprising the following steps:

scanning an object to be measured through an interference scanning system having a wideband light source, and obtaining scanned information;

performing the VSI to measure the VSI height data array based on the scanned information;

performing the PSI to measure the PSI height data array of relative to a position of a zero-light-path-difference based on the scanned information; and executing an integration calculation of the VSI height data array and the PSI height data array based on a slope correction factor and a displacement correction factor calculated from the VSI height data array and the PSI height data array.

2. The integrated interference scanning method as claimed in claim 1, wherein the slope correction factor is calculated by the steps of:

obtaining a slope of the VSI height data array and a slope of the PSI height data array respectively through a linear equation fitting coefficient; and obtaining the slope correction factor by dividing the slope of the VSI height data array with the slope of the PSI height data array.

3. The integrated interference scanning method as claimed in claim 1, wherein a pixel point having a best phase quality in the PSI height data array is selected as a PSI seeding point, and a scanning starting point of the object to be measured is selected as a VSI seeding point, and the displacement correction factor is calculated by the step of:

calculating a height difference of the VSI seeding point and the PSI seeding point as the displacement correction factor.

4. The integrated interference scanning method as claimed in claim 1, wherein the step of executing the integration calculation of the VSI height data array and the PSI height data array further comprising the step of:

executing the integration calculation of the VIS height data array and the PSI height data array, only after multiplying the PSI height data array by the slope correction factor, and then adding thereof with the displacement correction factor.

5. An integrated interference scanning method, which is used to integrate a VSI (vertical scanning interferometry) height data array measured by performing vertical scanning interferometry and a PSI (phase shifting interferometry) height data array measured by performing phase shifting interferometry, the integrated interference scanning method comprising the following steps:

scanning an object to be measured with a first scan interval through an interference scanning system having a wideband light source, and obtaining first scanned information;

performing the VSI to measure the VSI height data array of based on the first scanned information;

scanning the object to be measured relative to a position of zero-light-path-difference with a second scan interval through the interference scanning system having the wideband light source, and obtaining second scanned information;

performing the PSI to measure the PSI height data array of relative to the position of zero-light-path-difference based on the second scanned information; and executing the integration calculation of the VSI height data array and the PSI height data array based on a slope correction factor and a displacement correction factor calculated from the VSI height data array and the PSI height data array, thereby obtaining a surface profile of the object;

wherein, the first scan interval is larger than the second scan interval.

6. The integrated interference scanning method as claimed in claim 5, wherein the slope correction factor is calculated by the steps of:

obtaining a slope of the VSI height data array and a slope of the PSI height data array respectively through a linear equation fitting coefficient; and obtaining the slope correction factor by dividing the slope of the VSI height data array with the slope of the PSI height data array.

7. The integrated interference scanning method as claimed in claim 5, wherein a pixel point having a best phase quality in the PSI height data array is selected as a PSI seeding point, and a scanning starting point of the object to be measured is selected as a VSI seeding point, and the displacement correction factor is calculated by the step of the:

calculating a height difference of the VSI seeding point and the PSI seeding point as the displacement correction factor.

8. The integrated interference scanning method as claimed in claim 5, wherein the step of executing the integration calculation of the VSI height data array and the PSI height data array further comprising the step of:

executing the integration calculation of the VSI height data array and the PSI height data array, only after multiplying the PSI height data array by the slope correction factor, and then adding thereof with the displacement correction factor.

* * * * *